(12) United States Patent
Falk (10) Patent No.: US 12,008,144 B2
(45) Date of Patent: Jun. 11, 2024

(54) METHOD AND APPARATUS FOR TAMPER-PROOF STORAGE OF INFORMATION IN RESPECT OF OBJECT-RELATED MEASURES

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 342 days.

(21) Appl. No.: 16/495,116

(22) PCT Filed: Jan. 4, 2018

(86) PCT No.: PCT/EP2018/050200
§ 371 (c)(1),
(2) Date: Sep. 18, 2019

(87) PCT Pub. No.: WO2018/171949
PCT Pub. Date: Sep. 27, 2018

(65) Prior Publication Data
US 2020/0089915 A1   Mar. 19, 2020

(30) Foreign Application Priority Data
Mar. 22, 2017   (EP) ..................... 17162319

(51) Int. Cl.
*H04L 9/00* (2022.01)
*G06F 21/64* (2013.01)
*H04L 9/32* (2006.01)

(52) U.S. Cl.
CPC ............. *G06F 21/64* (2013.01); *H04L 9/3236* (2013.01); *H04L 9/3247* (2013.01); *H04L 9/3297* (2013.01); *H04L 9/50* (2022.05)

(58) Field of Classification Search
CPC ............. H04L 63/1425; H04L 63/1416; H04L 9/3236; H04L 9/3247; H04L 9/3297;
(Continued)

(56) References Cited

U.S. PATENT DOCUMENTS 10,755,226 B1 *   8/2020   Robyak ................ G06K 7/1413
11,334,882 B1 *   5/2022   Jameson ............... H04L 9/3231
(Continued)

FOREIGN PATENT DOCUMENTS

CN   106131048 A   11/2016
CN   106651346 A   5/2017
(Continued)

OTHER PUBLICATIONS

Dorri et al. "Blockchain in Internet of Things: Challenges and Solutions", https: https://arxiv.org/ftp/arxiv/papers/1608/1608.05187.pdf, Aug. 18, 2016 (Year: 2016).*
(Continued)

*Primary Examiner* — David J Pearson
(74) *Attorney, Agent, or Firm* — Schmeiser, Olsen & Watts LLP (57) ABSTRACT

Provided is a method and a system for the tamper-proof storage of information about object-related measures which are contained as transactions in transaction blocks that are interlinked in a transaction block chain of the object to which the measures relate, the transaction block chain being stored in an object data memory allocated to the object.

11 Claims, 5 Drawing Sheets

(58) Field of Classification Search
CPC . H04L 2209/38; G06F 21/564; G06F 16/285; G06F 21/64
See application file for complete search history.

(56) References Cited

U.S. PATENT DOCUMENTS

| | | | |
|---|---|---|---|
| 2016/0164684 A1* | 6/2016 | Owlett | H04L 9/3247 713/176 |
| 2016/0261690 A1 | 9/2016 | Ford | |
| 2017/0031676 A1 | 2/2017 | Cecchetti et al. | |
| 2017/0046693 A1 | 2/2017 | Haldenby et al. | |
| 2017/0046792 A1* | 2/2017 | Haldenby | G06Q 50/08 |
| 2017/0178072 A1* | 6/2017 | Poornachandran | H04L 9/3236 |
| 2017/0295157 A1* | 10/2017 | Chavez | G06F 21/6218 |
| 2017/0345011 A1* | 11/2017 | Salami | G06Q 20/42 |
| 2018/0054491 A1* | 2/2018 | Mankovskii | H04L 67/142 |
| 2018/0078843 A1* | 3/2018 | Tran | G09B 19/0038 |
| 2018/0097883 A1* | 4/2018 | Chow | H04L 67/12 |
| 2018/0183600 A1* | 6/2018 | Davis | H04L 9/3239 |
| 2018/0276666 A1* | 9/2018 | Haldenby | G06Q 20/10 |
| 2019/0052454 A1* | 2/2019 | Wright | H04L 9/0637 |
| 2019/0288854 A1* | 9/2019 | Xie | H04L 9/0891 |
| 2021/0182433 A1* | 6/2021 | Yan | G06F 21/64 |

FOREIGN PATENT DOCUMENTS

| | | |
|---|---|---|
| WO | 2017004527 A1 | 1/2017 |
| WO | WO 2017004527 A1 | 1/2017 |
| WO | 2018032379 A1 | 2/2018 |

OTHER PUBLICATIONS

PCT International Search Report dated Apr. 5, 2018 and corresponding to PCT International Application No. PCT/EP2018/050200 filed on Jan. 4, 2018.

* cited by examiner

METHOD AND APPARATUS FOR TAMPER-PROOF STORAGE OF INFORMATION IN RESPECT OF OBJECT-RELATED MEASURES

CROSS-REFERENCE TO RELATED APPLICATIONS

This application claims priority to PCT Application No. PCT/EP2018/050200, having a filing date of Jan. 4, 2018, which is based on European Application No. 17162319.2, having a filing date of Mar. 22, 2017, the entire contents both of which are hereby incorporated by reference.

FIELD OF TECHNOLOGY

The following relates to a method and a system for tamper-proof storage of information in respect of object-related measures, which are undertaken on an object, for example a device, or which are undertaken by the object itself.

BACKGROUND

Objects, for example devices, device components or other products, may comprise an object data memory for storing various information items in relation to the relevant object. By way of example, data in respect of the identity of the object or of other processes relating to the object can be stored in the object data memory of an object. By way of example, diagnostic data, servicing information data, repair information data or details of transferred ownership can be stored in an object data memory of the object. The object data memory of an object can be integrated in the object or can be physically connected to the object. Alternatively, the object data memory can also be situated at a distance from the object and can be assigned to the object. By way of example, information or data in respect of the object can be stored as a so-called digital twin or as part of a digital twin on a distant computer system, more particularly a web service or an IoT backend system. Particularly in the case of security-critical applications, it is necessary to protect the data stored in the object data memory of an object against tampering.

SUMMARY

An aspect relates to a method and a system for tamper-proof storage of information in respect of object-related measures.

According to embodiments of the invention, this aspect is achieved by a method and a system for tamper-proof storage of information in respect of object-related measures, having the features specified in the patent claims.

Accordingly, a method is disclosed for tamper-proof storage of information in respect of object-related measures, wherein the measures relating to the object are contained as transactions in transaction blocks that are linked together in a transaction blockchain of the object, the transaction blockchain being stored in an object data memory assigned to the object.

The transaction blocks of the transaction blockchain of the object may be linked together by way of a cryptographic hash function. This embodiment offers the advantage of further increasing the protection against tampering.

An associated individual hash function can be used for each object. In this embodiment, the protection against tampering is further increased.

An associated hash function can be used for a plurality of objects of a group of objects. This offers the advantage of a reduction in management outlay in the method according to embodiments of the invention.

The transaction blocks of the transaction blockchain of the object can be linked together by way of pointer addresses. This offers the advantage of a simple implementation.

Each transaction block may comprise at least one transaction, which specifies a measure undertaken on the object or a measure undertaken by the object itself. This embodiment offers the advantage of saving memory space.

An additional transaction block for the transaction blockchain of the object can be generated automatically as soon as a predetermined time period ends. This offers the advantage of simplifying the management of the stored data.

An additional transaction block for the transaction blockchain of the object can be generated automatically as soon as the number of transactions contained in the last transaction block of the transaction blockchain reaches a threshold. This likewise offers the advantage of simplifying the management of the data.

An additional transaction block for the transaction blockchain of the object can be generated automatically as soon as a certain event is detected. This likewise offers the advantage of simplifying the management of the data.

An additional transaction block for the transaction blockchain of the object can be generated automatically as soon as a corresponding user command is entered via an interface. This offers the advantage of allowing a user to prompt the generation of an additional transaction block.

A transaction can be selected from a group of predetermined transactions that are admissible for the object and the transaction can be stored in the last transaction block of the transaction blockchain. This offers the advantage of being able to predefine transactions.

Each transaction block of the transaction blockchain may contain a timestamp, a digital signature and/or proof-of-work evidence. This offers the advantage of further increasing the protection against tampering.

Following its successful validation, an additional transaction block can be linked to the last transaction block situated at the end of the transaction blockchain of the object. This likewise offers the advantage of increasing the protection against tampering.

Each transaction contains a validation program code or is assignable to a validation program code. This offers the advantage of the method according to embodiments of the invention being flexibly adaptable to various use cases.

An additional transaction block can be validated as valid should all transactions contained in the transaction block be verified as admissible by means of an associated validation program code. This offers the advantage of further increasing the protection against tampering.

A transaction, or each transaction, of a transaction block may have a public key of an object owner and a specification of a key algorithm used for a digital signature. This likewise offers the advantage of further increasing the protection against tampering.

The transaction blockchain of an object can be read from the object data memory of the object by means of a read device and the transactions contained in the transaction blocks of the read transaction blockchain are verified as admissible on the basis of their respective validation program code. This offers the advantage of the method according to embodiments of the invention being usable in a multiplicity of different use cases.

A transaction verified as admissible on the basis of its validation program code at the time of writing to the object data memory of the object and/or at the time of reading from the object data memory of the object can automatically trigger the corresponding measure on the object or confirms the measure being undertaken on the object. This likewise offers the advantage of the method according to embodiments of the invention being flexibly usable in a multiplicity of different use cases.

A plurality of transaction blocks of the transaction blockchain of an object can be automatically combined to form a transaction block as soon as a predetermined time period ends or as soon as the number of transaction blocks contained in the transaction blockchain reaches a threshold or in response to a detected event, in particular when memory in the object data memory runs low, or in response to an entered user command. This offers the particular advantage of minimizing the required memory space.

A system is disclosed for controlling and monitoring measures that can be undertaken on objects or that can be undertaken by objects themselves, wherein an object data memory is assigned to each object of the system, wherein the measures relating to the object are contained as transactions in transaction blocks that are linked together in a transaction blockchain of the object, the transaction blockchain being stored in the object data memory of the object.

The objects may comprise hardware components, more particularly devices. This offers the advantage of the system according to embodiments of the invention being employable in an industrial installation, in particular.

The objects may comprise software components, in particular utility software. This offers the advantage of the system according to embodiments of the invention also being able to be used in a software system.

BRIEF DESCRIPTION

Some of the embodiments will be described in detail, with references to the following Figures, wherein like designations denote like members, wherein.

DETAILED DESCRIPTION

Figures 1, 2:
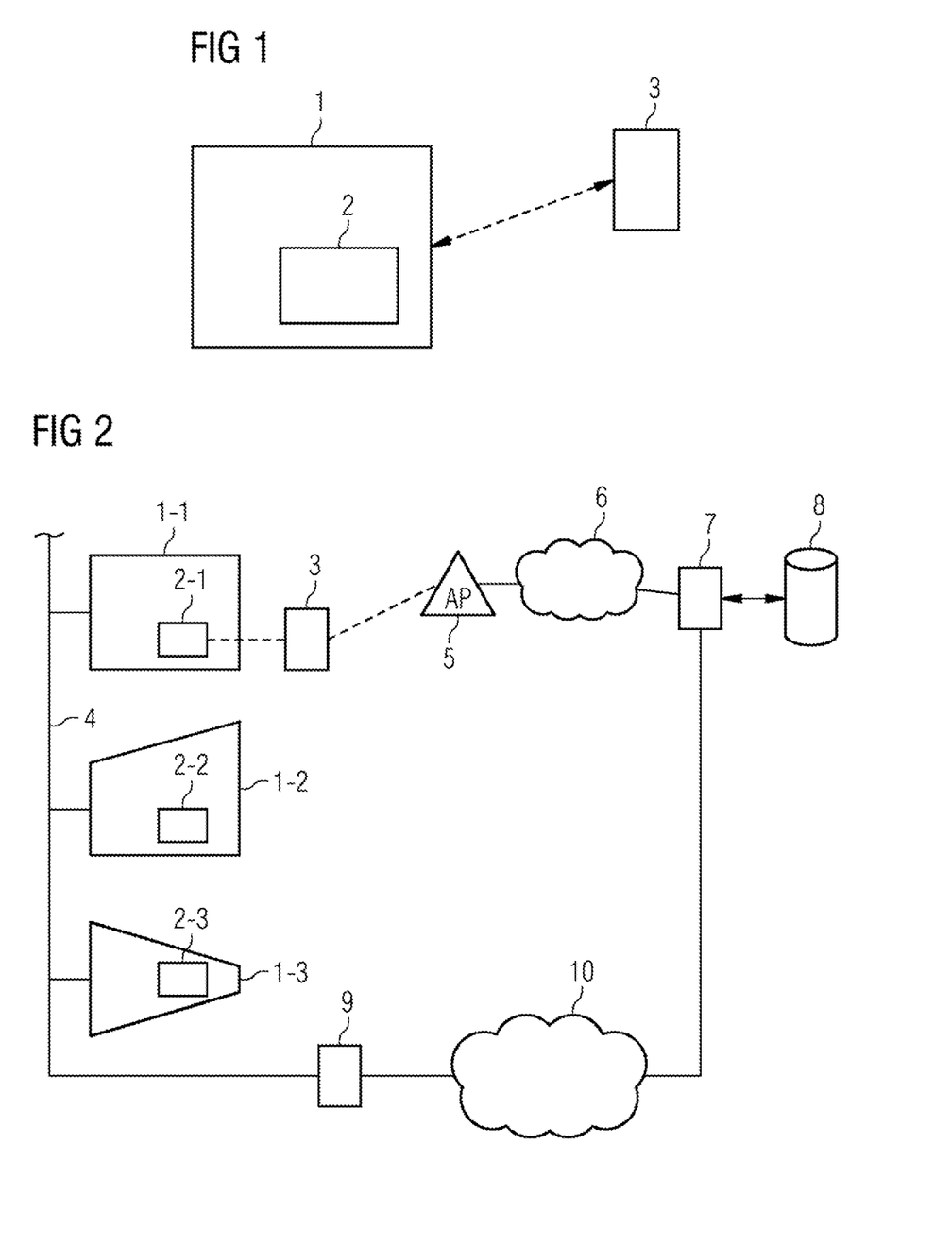
FIG. 1 shows a schematic block diagram for explaining the functionality of the method according to embodiments of the invention and the apparatus according to embodiments of the invention for tamper-proof storage of information in respect of object-related measures.
FIG. 2 shows a schematic illustration for explaining possible embodiments of a system according to embodiments of the invention for controlling and monitoring object-related measures.

As may be identified from FIG. 1, an object 1 comprises an associated object data memory 2. In the illustrated exemplary embodiment, the object data memory 2 of the object 1 is integrated or contained in the object 1.

Alternatively, the object data memory 2 may also be provided at a distance from the associated object 1, for example in a distant data memory or a distant database. By way of example, the object data memory 2 is assignable to the object by way of an ID of the object 1. In the illustrated exemplary embodiment according to FIG. 1, data can be written to the object data memory 2 and/or data can be read from the object data memory 2 with the aid of a portable write and read device 3. The object 1 can be a device, for example a smart drive. In general, the object 1 may be a hardware component or a plurality of assembled hardware components. By way of example, the object 1 is a device of an industrial installation. Examples for objects that may comprise an object data memory 2 include controllers, programmable logic controllers, sensors, actuators, input/output modules, transmissions, turbines, motors, converters, computed tomography scanners, mammography devices, ultrasonic devices or circuit breakers. Alternatively, the object 1 can also be a software component, more particularly utility software. By way of example, the software component can be a factory service, a management service or a cloud service, for example. Here, an object data memory 2 is assignable to each software component of the system.

Figure 3:
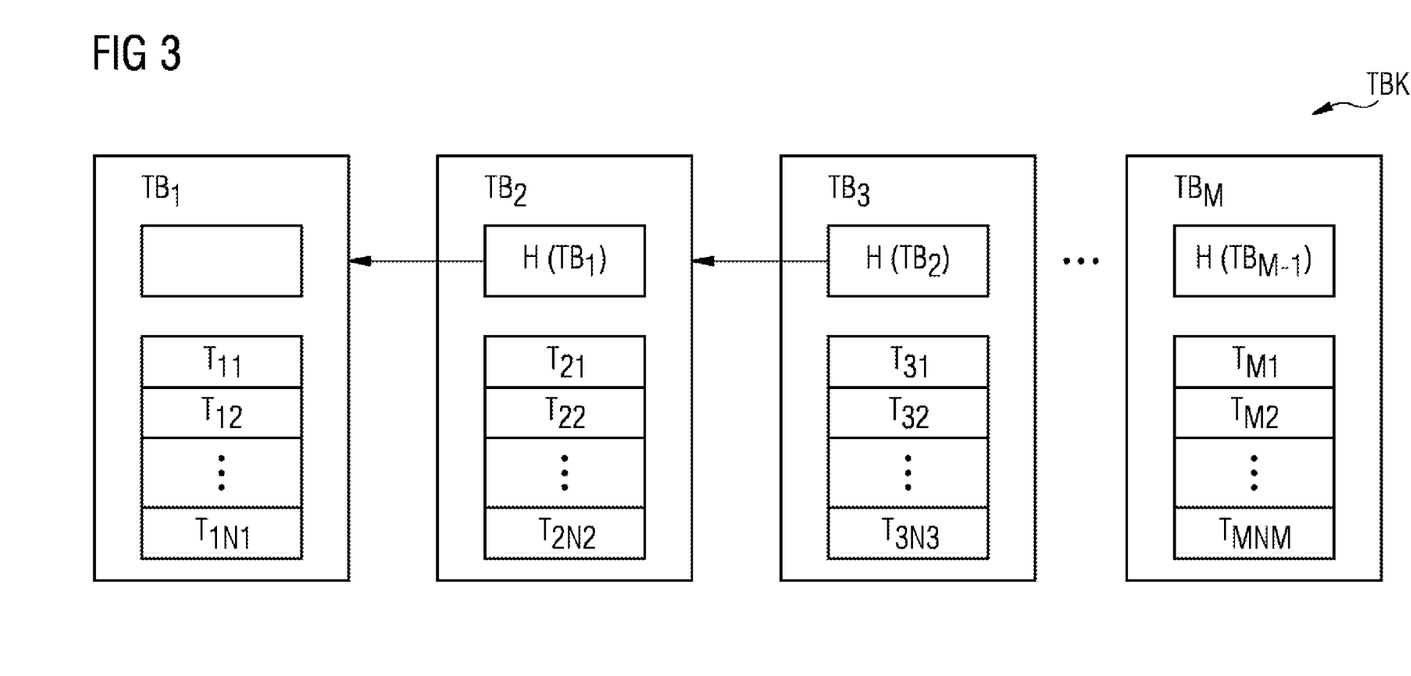
FIG. 3 shows a schematic illustration of a transaction blockchain usable in the method according to embodiments of the invention and the system according to the invention.

Situated in the object data memory 2 of an object 1, there is at least one transaction blockchain TBK, as illustrated in, e.g., FIG. 3, provided for the object 1. Any measure relating to the object 1 is noted as a transaction T in a transaction block TB of the transaction blockchain TBK. The measures relating to the object 1 are contained as transactions T in transaction blocks TB, which are linked together in the transaction blockchain TBK of the relevant object 1. This transaction blockchain TBK is stored in an object data memory 2 assigned to the object 1. Each transaction block TB of the transaction blockchain TBK comprises at least one transaction T, which specifies a measure undertaken on the object 1 or specifies a measure undertaken by the object 1 itself.

In the exemplary embodiment illustrated in FIG. 3, the transaction blocks TB of the transaction blockchain TBK of the object 1 are linked together by way of a cryptographic hash function H. The transaction block TB that forms a data structure comprises at least one hash value that is formed as a function of the preceding transaction block TB. Each transaction block TB contains one or more transactions T, as illustrated in FIG. 3. Each transaction T within a transaction block TB specifies a measure undertaken on the object 1, for example a servicing measure, or a measure undertaken by the object 1 itself, for example a production step. In one possible embodiment, a hash value can be formed as a function of the transactions T. The number of transactions T contained in a transaction block TB may differ. By way of example, the first transaction block TB1 of the transaction blockchain TBK illustrated in FIG. 3 contains n1 transactions T and the second transaction block TB2 of the transaction blockchain TBK contains n2 transactions T. Each transaction block TB contains at least one transaction T in respect of an object-related measure.

In one possible embodiment, an associated individual hash function H is used for each object 1. In an alternative embodiment, an associated hash function F can be used for a plurality of objects of a group of objects. In the embodiment illustrated in FIG. 3, the transaction blocks TB of the transaction blockchain TBK are linked together by way of a cryptographic hash function H. In an alternative embodiment, the transaction blocks TB of the transaction blockchain TBK of the object 1 may also be linked together by way of pointer addresses.

In the embodiment illustrated in FIG. 3, the transaction blocks TB of the transaction blockchain TBK are linked in one direction. In a further alternative embodiment, the transaction blocks TB of the transaction blockchain TBK may also be linked together twofold in both directions. This allows the insertion and removal of transaction blocks TB from the transaction blockchain TBK.

In a possible embodiment of the system according to the invention and of the method according to embodiments of the invention, an additional transaction block TB for the transaction blockchain TBK of the object 1 is generated automatically as soon as certain circumstances occur.

In one possible embodiment, an additional transaction block TB for the transaction blockchain TBK of the object 1 is generated automatically as soon as a predetermined time period ends. By way of example, an additional transaction block TB for the transaction blockchain TBK is automatically generated at periodic time intervals, for example every 24 hours.

In a further possible embodiment of the method according to the invention, an additional transaction block TB for the transaction blockchain TBK of an object 1 is generated automatically as soon as the number of transactions T contained in the last transaction block TB of the transaction blockchain TBK reaches a certain threshold or takes up a certain amount of memory space.

In a further possible embodiment of the method according to the invention, an additional transaction block TB for the transaction blockchain TBK of the object 1 is generated automatically as soon as a certain event is detected. To this end, the object 1 may comprise, e.g., sensors for detecting events. The event may also be a change in the state of the object 1, for example. The detected event that caused the generation of a transaction block TB may be an internal event within the object 1 or an external event outside of the object 1.

In a further possible embodiment of the method according to the invention, an additional transaction block TB for the transaction blockchain TBK of the object 1 is generated automatically as soon as a corresponding command, more particularly a user command, is received. By way of example, a user or operator of the object 1 can enter a user command via an interface, the user command leading to an additional transaction block TB for the transaction blockchain TBK of the object 1 being generated automatically.

In a possible embodiment, a transaction T can be selected from a group of predetermined transactions T that are admissible for the object 1 and the transaction can be stored in the last transaction block TB of the transaction blockchain TBK of the object 1. Different objects 1 or devices may have different admissible transactions T for object-related measures. In one possible embodiment, the various object-related measures can be indicated to a user or operator of the installation and the user has the option of selecting object-related measures and the associated transaction T by way of a user interface. Here, the object-related measure is a measure undertaken by the object 1 itself or a measure undertaken on the object 1.

Figure 4:
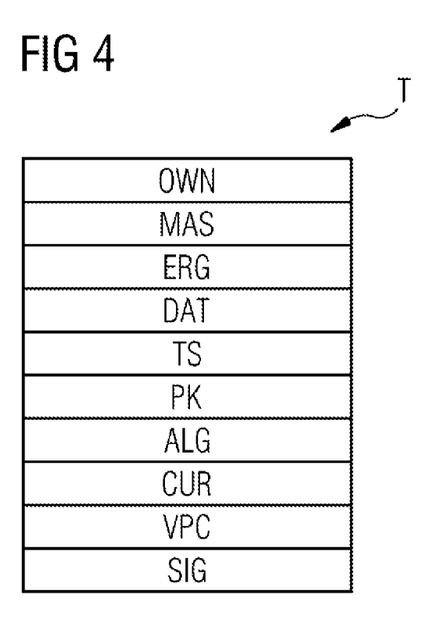
FIG. 4 shows a schematic illustration of an exemplary embodiment of a transaction contained within a transaction block of the transaction blockchain, as may be used in the method according to embodiments of the invention and the system according to embodiments of the invention.

FIG. 4 shows a possible exemplary data structure of a transaction T that may be contained within a transaction block TB of the transaction blockchain TBK. Each transaction T may comprise one or more of the data fields illustrated in FIG. 4. In one possible embodiment, the owner or the responsible organization for the object 1 (ownership) OWN is contained in the transaction T. Furthermore, the relevant object-related measure MAS may be contained in the transaction T. In one possible embodiment, a result ERG of the measure is also specified. By way of example, in the case of a self-test measure, there may be a specification as to whether the self-test was carried out successfully (okay) or not (not okay).

Furthermore, the transaction T may contain a date DAT and a timestamp TS. The date DAT and the timestamp TS are, e.g., the time at which the object-related measure was undertaken. Furthermore, the transaction T may specify, for example, a public key ok, (public key) of an object owner and the specification of a key algorithm (ALG) used for a digital signature SIG. Furthermore, a curve form CUR of an elliptic curve used in the encryption algorithm ALG may be specified, for example.

Further, the transaction T contains a validation program code VPC or is at least assignable to a validation program code VPC.

An additional transaction block TB is only linked to the last transaction block TB situated at the end of the transaction blockchain TBK of the object 1 following a successful validation. Here, the validation is implemented with the aid of the validation program codes VPC associated with the transactions T of the transaction block TB. An additional transaction block TB is validated as valid should all transactions T contained in the transaction block TB be verified as admissible by means of their respective associated validation program code VPC.

The transaction blockchain TBK of an object 1 can be read by means of a read device from the object data memory 2 of the object 1. The transactions T contained in the transaction blocks TB of the read transaction blockchain TBK can be verified as admissible on the basis of their respective validation program code VPC in one possible embodiment.

A transaction T verified as admissible on the basis of its validation program code VPC can automatically trigger the corresponding measure MAS on the object 1 or can confirm the measure MAS being undertaken on the object 1 by third parties in one possible embodiment. In one possible embodiment, the measure MAS is triggered or confirmed at the time of writing the associated transaction T in the object data memory 2 of the object 1. Alternatively, the relevant measure MAS can also be triggered or confirmed at the time of reading the associated transaction T from the object data memory 2 of the object 1.

In a further possible embodiment of the method according to the invention and of the system according to embodiments of the invention, a plurality of transaction blocks TB of the transaction blockchain TBK of an object 1 can be automatically combined to form a transaction block TB. In one possible embodiment, this is implemented as soon as a predetermined time period ends. Alternatively, the combination of a plurality of transaction blocks TB can be implemented as soon as the number of the transaction blocks TB contained in the transaction blockchain TBK reaches a threshold. Furthermore, combining the transaction blocks TB of a transaction blockchain TBK can be implemented as a response to a detected event. By way of example, a plurality of transaction blocks TB of a transaction blockchain TBK are combined automatically as soon as low memory is detected in the object data memory 2. Furthermore, a plurality of transaction blocks TB of a transaction blockchain TBK of the object 1 can automatically be combined in response to a user or control command in one possible embodiment. The automatic combination of transaction blocks TB of the transaction blockchain TBK can avoid an overflow of the object data memory 2. In a further possible embodiment, each transaction block TB of a transaction blockchain TBK has a dedicated timestamp TS, a digital signature and/or proof-of-work evidence. Proof-of-work evidence is the solution to a computationally intensive problem, which should be solved as a function of the block content. Such a computationally intensive problem is also referred to as a cryptographic puzzle.

A transaction T may contain a program code as a smart contract. In particular, the program code specifies which transactions T are admissible. As a result, different processes can be flexibly realized by a common transaction blockchain infrastructure. In one possible embodiment, the linking can be implemented by means of a hash tree, for example a Merkle tree or Patricia tree, the root hash value of which is stored in a transaction block TB.

By way of example, an object-related measure may relate to a servicing or repair of a device. A transaction T belonging to the measure is entered in the transaction blockchain TBK of the object 1 in the object data memory 2 thereof. The corresponding transaction T is digitally signed, for example, by the service technician who has undertaken the repair or the servicing. In a further measure, the same device, for example a drive device, may undertake a further measure, for example a self-test by the control unit present in the device. If the measure, for example the self-test, is implemented successfully, the control unit of the device can digitally sign the measure (self-test).

A change in ownership of the object 1 is a further example of a measure. By way of example, a first owner or proprietor is initially responsible for an object 1 within an installation and the responsibility subsequently changes to another second owner or proprietor. By way of example, a measure may contain an entry that specifies the change in ownership or the change in responsibility. By way of example, a smart contract program code for the change in ownership may be contained within a transaction T. In the smart contract, an owner themselves can specify specific rules according to which an ownership change, for example, is possible, or according to which a diagnostic access, for example, is possible.

Furthermore, an owner of the object 1, for example a device, can define rules that relate to the operation or the use of the device or the object 1 by way of a transaction T. By way of example, a maximum available power of a drive device 1 and the use duration can be defined. By way of example, this facilitates use-dependent licensing of the drive device or object 1. Consequently, this type of smart contract has effects on the physical use of the relevant device, for example drive device.

The object data memory 2 can be provided in a module of a device. This module accepts an additional transaction block TB within the transaction blockchain TBK only if the additional transaction block TB is checked as being valid. To this end, the various transactions T of the transaction block TB are checked or verified in respect of their admissibility. This is implemented using the transactions T present in the transaction blockchain TBK by means of their validation program codes VPC or smart contracts. Accordingly, a transaction block TB is only added to the transaction blockchain TBK if it is valid. By way of smart contracts, owners, proprietors, users of the device or object 1 can only carry out admissible actions, with the rules to this end being flexibly definable. In one further possible embodiment variant, an object data memory module present in the device only accepts an additional transaction block TB if this transaction block TB is confirmed as being valid by a transaction blockchain infrastructure. In this variant, the object data memory module of the device checks a transaction block TB in respect of whether it has been confirmed as valid, for example by virtue of a valid solution being present for the cryptographic puzzle for this transaction block TB.

By way of example, a smart contract SC in a drive device may be as follows:

Set power limit ("600 Watt");
Allow update (signed by, 673A5342ADFCA701EB7283729AFD980 . . . );

In this example, the smart contract SC limits the maximum available power of a drive device 1 to 600 watts. Moreover, the smart contract SC defines a public key PK, by means of which the digital signature of an admissible change of the use restrictions can be checked.

FIG. 2 shows an exemplary embodiment of the system according to the invention for controlling and/or monitoring measures that can be undertaken on objects 1 or that can be undertaken by objects 1 themselves. In the illustrated example, the various objects 1 are devices of an installation, which are interconnected by way of a local data bus 4. Each object 1-*i* of the installation comprises an integrated object data memory 2-*i*. A portable write and read device 3 allows a user or operator of the installation to write data to the various object data memories 2-*i* and/or read data from the various object data memories 2-*i* of the various devices 1-*i*. This is implemented in wireless fashion by way of a wireless communications link between the relevant device and the write/read device 3. In one possible embodiment, the portable device 3 is a smartphone of a user, by means of which a corresponding use program is executed. The data read from an object data memory 2 can be transferred to a distant server 7, which has access to an associated database 8, from the portable write/read device 3 via an access point 5 and a first network 6 in one possible embodiment.

Furthermore, the local data network of the installation can be connected to the distant server 7 via a gateway 9 and a further network 10. An associated transaction blockchain TBK is assigned to each object 1 of the installation. This transaction blockchain TBK of the object 1 is situated in the local object data memory 2-*i* of the relevant object 1 in one possible embodiment. A twin or copy of the transaction blockchain TBK of the object 1 is situated in the database or the data memory of the distant server 7 in one possible embodiment of the system according to the invention.

In a further possible alternative embodiment, at least some of the various objects or devices 1-*i* of the installation do not comprise an integrated object data memory 2 and the transaction blockchain TBK of the object 1 is only situated in a corresponding memory region of the distant database 8. The objects 1-*i* in the exemplary embodiment illustrated in FIG. 2 are hardware components, in particular devices. Alternatively, the objects 1-*i* can also be software components which, for example, are situated in a data memory of various devices of the installation and which control or monitor installation elements. By way of example, this also allows servicing measures of software components to be carried out. The evaluation of the information contained in the transaction blockchain TBK can be implemented locally in situ at the respective object 1 or from a distance by the server 7 of the system. By way of example, a transaction blockchain TBK of an object 1 can be evaluated by a data processing unit or control unit of the system. By way of example, the transaction blockchains TBK, which are stored in the object data memory 2-1 of the object 1-1 of the installation, can be read by the server 7 via the network 10 for the purposes of evaluating the information contained therein. In this way, the server 7 receives the information stored in tamper-proof fashion about all object-related measures of the object 1-1, for example servicing measures, repair measures, self-test processes and the like. Furthermore, a service person working in the installation can transfer information about various objects or devices 1 of the installation to the central server 7 via the network 6 with the aid of the write and read device 3. By evaluating the transaction blockchain TBK, it is possible to identify undertaken tampering or attempts of tampering and to introduce corresponding countermeasures. By evaluating the information contained in the transaction blockchain TBK, it is possible, for example, to establish a history of object-related measures. By way of example, this facilitates predictive or anticipatory servicing of objects 1 of an installation.

Figure 5:
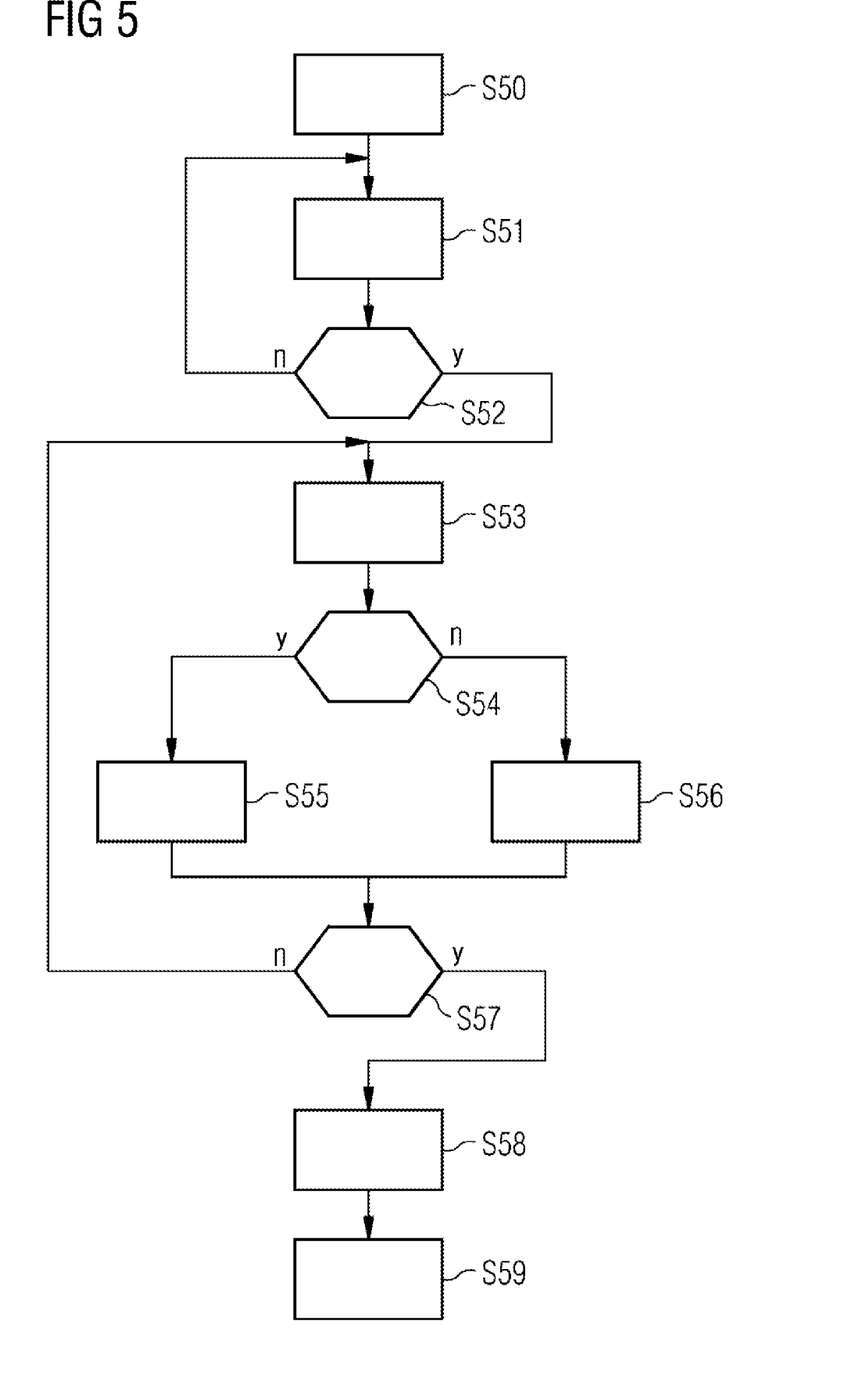
FIG. 5 shows a flowchart for illustrating a write process undertaken in the method according to embodiments of the invention.

FIG. 5 shows a flowchart for illustrating an exemplary embodiment of the write process undertaken in the system according to the invention. After a start step S50, a transaction T is detected as candidate in a step S51. In a further step S52, a check is carried out as to whether or not all transactions T of the relevant object 1 have been detected. In step S53, the respective detected transaction T is checked in respect of its validity with the aid of its associated validation program code VPC.

Whether the respective transaction T is valid is determined in step S54. Should the validation be carried out successfully, the relevant transaction T is included in the transaction block TB in step S55. If the transaction T is not valid, it is discarded in step S56.

In the further step S57, a check is carried out as to whether all transactions T were checked as valid so as to complete a transaction block TB. If this is the case, a new transaction block TB can be generated or produced for the transaction blockchain TBK of the corresponding object 1 in step S58. If the validation process has not yet been completed, the process returns to step S53 and the next transaction T is checked in respect of its validity or admissibility. The write process or the production process for producing a transaction block TB ends in step S59.

Figure 6:
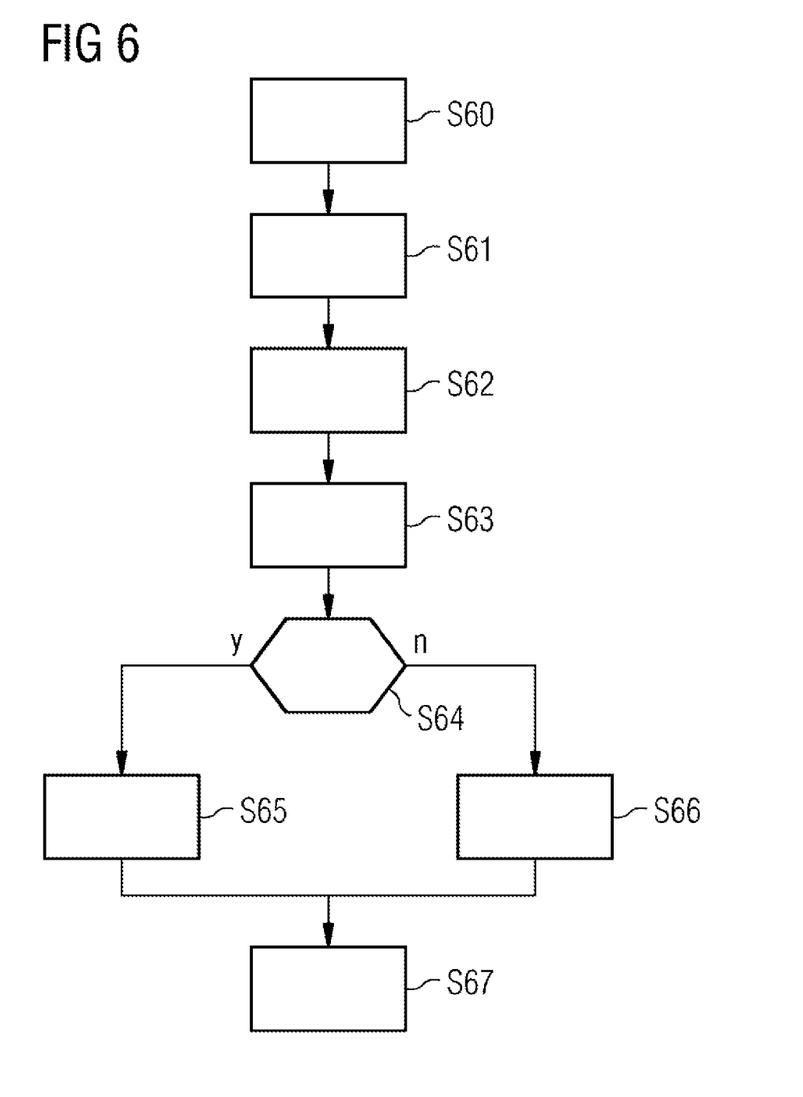
FIG. 6 shows a flowchart for illustrating a read process undertaken in the method according to embodiments of the invention.

FIG. 6 shows the flowchart for illustrating a possible read process. In a start step S60, a transaction blockchain TBK of an object 1 is read in S61 from the object data memory 2 of the object 1. A transaction T is identified within the read transaction block TB in step S62. The validity of the transaction T contained within the transaction block TB is checked in a further step S63. If the relevant transaction T is identified as valid in step S64, it is accepted as valid in step S65 and the measure described therein is optionally carried out or confirmed. If the relevant transaction T is not identified as valid in step S64, the relevant transaction T is discarded in step S65 as invalid. The process ends in step S66.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for tamper-proof storage of information with respect to object-related measures, comprising:
    storing the information with respect to the object-related measures,
    wherein the object-related measures are relating to an object and are contained as transactions in transaction blocks that are linked together in an object-specific transaction blockchain of the object, the object-specific transaction blockchain being stored in an object data memory assigned to the object,
    wherein each transaction is captured,
    wherein each transaction contains a validation program code (VPC),
    wherein the VPC defines rules that specify which transactions are admissible,
    wherein each transaction block of the transaction blocks comprises at least one transaction that specifies a measure undertaken on the object or a measure undertaken by the object itself,
    wherein an additional transaction block, following its successful validation, is linked to the last transaction block situated at the end of the object-specific transaction blockchain of the object,
    wherein the object-specific transaction blockchain of the object is read from the object data memory of the object and the transactions contained in the transaction blocks of the object-specific transaction blockchain are verified as admissible on the basis of their respective validation program code, and
    wherein a transaction verified as admissible on the basis of its validation program code at the time of reading from the object data memory of the object which automatically triggers the measure being undertaken on the object, wherein the measure relates to a change in ownership of the object.

2. The method as claimed in claim 1, wherein the transaction blocks of the object-specific transaction blockchain of the object are linked together by way of a cryptographic hash function, wherein an associated individual hash function is used for each object or wherein an associated hash function is used for a plurality of objects of a group of objects.

3. The method as claimed in claim 1, wherein the transaction blocks of the object-specific transaction blockchain of the object are linked together by way of pointer addresses.

4. The method as claimed in claim 1, wherein an additional transaction block of the object-specific transaction blockchain of the object is generated automatically as soon as a predetermined time period ends or as soon as the number of transactions contained in a last transaction block of the object-specific transaction blockchain reaches a threshold or in response to a detected event or in response to a user command.

5. The method as claimed in claim 1, wherein an admissible transaction is selected from a group of predetermined transactions that are admissible for the object and the admissible transaction is stored in the last transaction block of the object-specific transaction blockchain.

6. The method as claimed in claim 1, wherein each transaction block of the object-specific transaction blockchain receives a timestamp, a digital signature and/or proof-of-work evidence.

7. The method as claimed in claim 1, wherein an additional transaction block is validated as valid should all transactions contained in the additional transaction block be verified as admissible by means of their associated validation program code.

8. The method as claimed in claim 1, wherein at least one, or each, transaction has a public key of an object owner and a specification of a key algorithm used for a digital signature.

9. The method as claimed in claim 1, wherein a plurality of transaction blocks of the object-specific transaction blockchain of an object are automatically combined to form a transaction block as soon as a predetermined time period ends or as soon as the number of transaction blocks contained in the object-specific transaction blockchain reaches a threshold or in response to a detected event, in particular when memory in the object data memory runs low, or in response to a user command.

10. A system for controlling and monitoring measures that can be undertaken on objects or that can be undertaken by objects themselves, comprising:
  a plurality of objects, wherein the plurality of objects are physical devices, wherein an object data memory is assigned to each of the plurality of objects of the system, wherein each transaction contains a validation program code or is assignable to a validation program code, wherein the VPC defines rules that specify which transactions are admissible, and wherein each transaction block of the transaction blocks comprises at least one transaction which indicates a measure carried out on a respective one of the plurality of objects or a measure carried out by the respective one of the plurality of objects, wherein the system is configured to carry out a method that includes:
    storing the information with respect to the object-related measures,
  wherein the object-related measures are relating to an object and are contained as transactions in transaction blocks that are linked together in an object-specific transaction blockchain of the object, the object-specific transaction blockchain being stored in an object data memory assigned to the object,
  wherein each transaction is captured,
  wherein an additional transaction block, following its successful validation, is linked to the last transaction block situated at the end of the object-specific transaction blockchain of the object,
  wherein the object-specific transaction blockchain of the object is read from the object data memory of the object and the transactions contained in the transaction blocks of the object-specific transaction blockchain are verified as admissible on the basis of their respective validation program code, and
  wherein a transaction verified as admissible on the basis of its validation program code at the time of reading from the object data memory of the object which automatically triggers the measure being undertaken on the object, wherein the measure relates to a change in ownership of the object.

11. The system as claimed in claim 10, wherein each of the plurality of objects comprise hardware components, more particularly devices, and/or software components, more particularly utility software.

* * * * *